United States Patent [19]
Toss

[11] Patent Number: 6,134,387
[45] Date of Patent: *Oct. 17, 2000

[54] PROCESS AND DEVICE FOR HOT GAS WELDING OF PLASTIC SHEETS WITH ELECTRICALLY HEATED TUBULAR GAS FLOW CONDUIT

[76] Inventor: Ramon Toss, Hainstrasse 13, D-35418 Alten-Buseck, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,162

[22] Filed: May 10, 1996

[30] Foreign Application Priority Data

May 15, 1995 [DE] Germany ............................ 195 17 752
Nov. 15, 1995 [DE] Germany ............................ 195 42 488

[51] Int. Cl.$^7$ .................................................. B29C 65/10
[52] U.S. Cl. ......................... 392/478; 392/379; 156/497; 156/499; 156/304.6
[58] Field of Search ..................................... 392/478, 379; 156/499, 497, 60, 304.6; 53/370.9, 373.9, 375.9, 377.7, 477, 478, 479; 239/135, 136, 133–134, 132

[56] References Cited

U.S. PATENT DOCUMENTS

| | | | |
|---|---|---|---|
| 2,175,224 | 10/1939 | Slayter ..................................... | 392/478 |
| 3,311,525 | 3/1967 | Fanuzzi et al. . | |
| 3,380,229 | 4/1968 | Nelson .................................... | 156/497 |
| 3,409,977 | 11/1968 | Johnson ................................... | 156/497 |
| 3,582,968 | 6/1971 | Buiting et al. .......................... | 392/478 |
| 3,606,727 | 9/1971 | Davis ..................................... | 156/497 |
| 3,847,540 | 11/1974 | Farfaglia et al. ....................... | 156/497 |
| 4,180,723 | 12/1979 | Szupillo .................................. | 392/478 |
| 4,473,432 | 9/1984 | Leader et al. . | |
| 4,506,146 | 3/1985 | Rice et al. . | |
| 5,196,667 | 3/1993 | Gammelin ............................... | 392/379 |
| 5,483,040 | 1/1996 | Fortune .................................. | 219/230 |

FOREIGN PATENT DOCUMENTS

| | | |
|---|---|---|
| 1093844 | 5/1954 | France . |
| 1072177 | 9/1954 | France . |
| 1207226 | 2/1960 | France . |
| 2334453 | 10/1977 | France . |
| 275586 | 6/1914 | Germany .............................. 392/478 |
| 1992254 | 5/1968 | Germany . |
| 1 479 840 | 4/1969 | Germany . |
| 1939571 | 2/1971 | Germany . |
| 1 679 978 | 10/1973 | Germany . |
| 28 45 652 | 4/1980 | Germany . |
| 37 40 426 | 6/1989 | Germany . |
| 52-16038 | 2/1977 | Japan .................................... 392/478 |
| 60-117308 | 6/1985 | Japan . |
| 4-367369 | 12/1992 | Japan . |
| 6-23846 | 2/1994 | Japan . |
| 480156 | 12/1969 | Switzerland . |
| 1200303 | 7/1970 | United Kingdom . |
| 1309941 | 3/1973 | United Kingdom . |
| 2 207 882 | 2/1989 | United Kingdom . |

*Primary Examiner*—John A. Jeffery
*Attorney, Agent, or Firm*—Larson & Taylor, PLC

[57] ABSTRACT

A process and device are used to weld plastic sheets with hot gas. Conventionally for welding with hot gas, the gas was conveyed over an electrically heated body. However, temperature fluctuations occurred that were difficult to correct and the result was a relatively high power consumption. In order to make a precise temperature guidance with a favorable efficiency possible, the gas is blown through a tubular heat conductor (10) with outlet openings (16) in its circumference wall and against a plastic sheet, and the tube body (10) is heated by an electrical current that is controlled by at least one temperature sensor exposed to the temperature of the tube body and/or the hot gas. Preferably, the tube body (10) itself is used as a temperature sensor, while its resistance, which changes with the temperature, is used to control the current intensity.

10 Claims, 2 Drawing Sheets

PROCESS AND DEVICE FOR HOT GAS WELDING OF PLASTIC SHEETS WITH ELECTRICALLY HEATED TUBULAR GAS FLOW CONDUIT

FIELD OF THE INVENTION

The invention concerns a process and a device for welding plastic sheets with hot gas.

In industry, hot air is used frequently to solder or weld plastic sheets; in order to obtain favorable welding results, hot air with as precise as possible a temperature is blown against the points to be welded.

BACKGROUND OF THE INVENTION

In a known process, the air used for the heating is conveyed over a heating body with electrically heated wire spirals. The temperature of hot air produced in this manner, though, is subject to fluctuations that are difficult to correct since the regulation reacts sluggishly as a result of the large mass; the power consumption of this process is relatively high because the air flow is allowed to flow continuously due to the long heating time.

SUMMARY OF THE INVENTION

The object of the invention is comprised in establishing a process of the kind described at the beginning with which the temperature of the hot gas can be very precisely regulated and which has a favorable efficiency.

According to the invention, the object is attained by a process in which the gas is blown through a tubular heating conductor with one or more outlet openings it its circumference wall and against a plastic sheet disposed at a certain distance from the tube body, and to heat the gas, an electric current is conducted through the tube body, the intensity of which current is controlled by at least one temperature sensor exposed to the temperature of the tube body and/or the hot gas.

With the aid of the temperature sensor, the temperature of the tube body and the gas can be very precisely detected and adjusted. In addition, because the heating time and reaction time of the regulation are very short due to the low mass, only very slight fluctuations in the temperature of the emerging gas flow are produced and the efficiency is improved. In a preferred embodiment, the tube body itself is also used directly as a temperature sensor, while the intensity of the current is controlled as a function of the tube body resistance, which changes with the temperature. This resistance can be very precisely detected with the aid of electronic circuits.

In a suitable manner, the plastic sheet is conveyed past the outlet openings of the hot gas, by means of which a continuous welding process is produced. On an individual basis, there is also the possibility of working with a pulsed gas flow.

A further object of the invention is to make a device for carrying out the above described process. This object is attained according to the invention by means of a device with a tubular heat conductor that has at least one gas inlet and one or more gas outlet openings in its circumference wall and has electrical connections on its ends, which connections are connected to a current source whose current intensity can be controlled by at least one temperature sensor exposed to the temperature of the tube body and/or the gas flowing out.

The tube body can have various cross sectional shapes, e.g. it can have a round, oval, quadrilateral, or other profile. The shape of the gas exit openings can also turn out differently according to the requirements. In addition to circular exit openings, e.g. slot-shaped ones are used, which can extend crosswise or parallel to the longitudinal axis of the tube. A single, long exit slot can be used instead of a row of small holes or slots.

In order to further improve the efficiency—which is favorable anyway—in comparison to prior devices for welding with hot air, it is advantageous to provide the tube body with a thermal insulation that has corresponding holes for the gas to exit.

An exemplary embodiment of the invention is explained in more detail below in conjunction with the accompanying drawings wherein FIG. 1 is schematic diagram showing the basic elements of the method and device of the invention;

FIG. 2 is a side elevational view of one embodiment of the tubular member of FIG. 1;

FIG. 3 is a side elevational view of a further embodiment of the tubular member of FIG. 1;

FIG. 4 is a plan view of a further embodiment of the tubular member; and

FIG. 5 is a longitudinal cross sectional view of the tubular member of FIG. 1.

DETAILED DESCRIPTION OF THE INVENTION

In its straight, intermediary region, the U-shaped tube body 10 has a multitude of outlet openings 16 through which the blown air can flow out against a plastic sheet or film F which is conveyed past the tube body in its longitudinal direction as indicated by arrow A, at a certain distance from it. Electrical connections 18, 20 are affixed to its legs in the region of the tube ends 12, 14 and permit it to conduct an electric current through the tube body at a low voltage of e.g. approximately 10–40 volts. As a result, it heats up so that the air flowing through is also heated. Depending upon tube geometry, material, thickness of the plastic sheet to be welded, and infeed speed, the tube body 10 should be kept as constantly as possible at a particular temperature level in order to assure an even welding of the plastic sheet.

Figure 1:
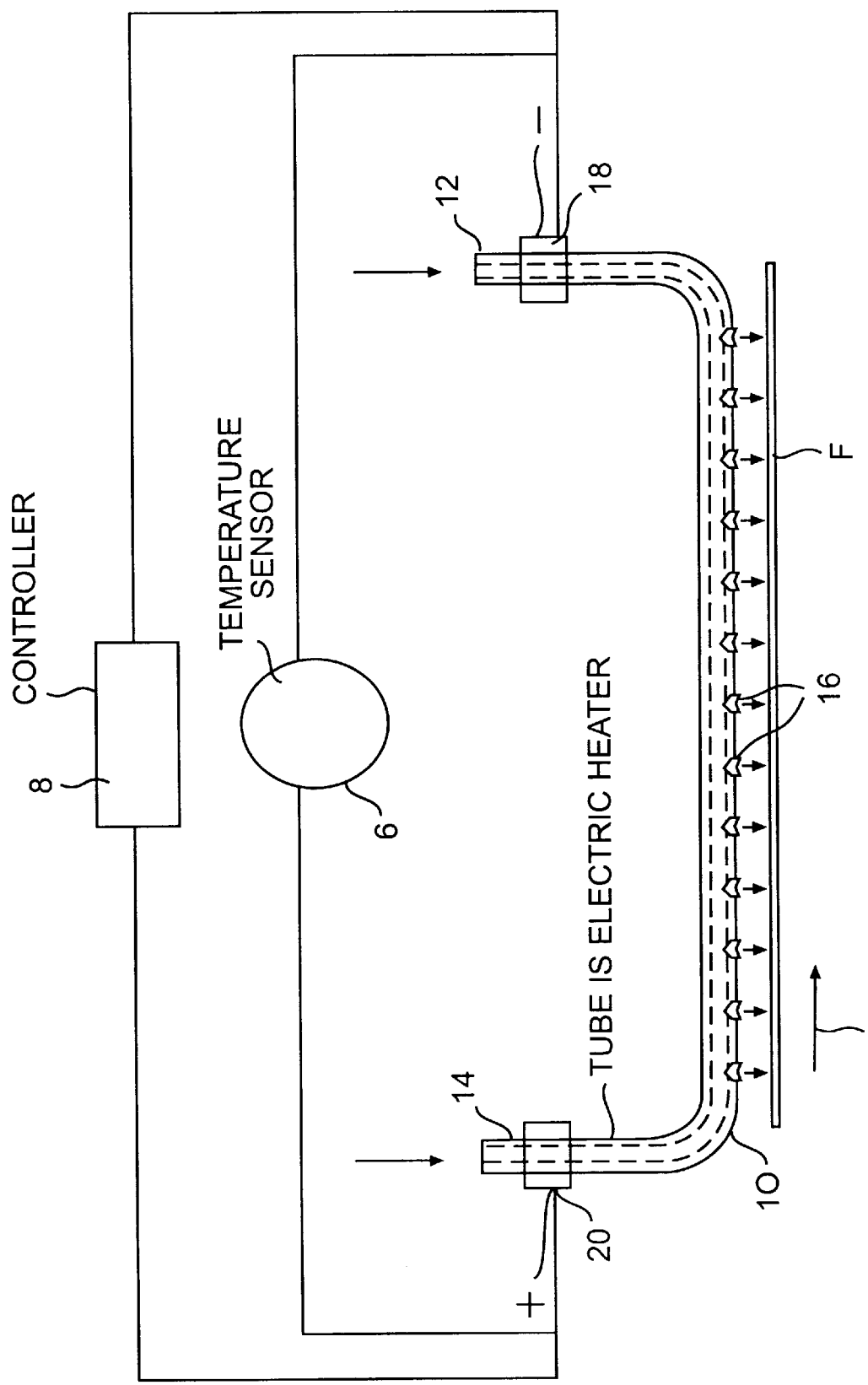
Referring to FIG. 1, there is shown an essentially U-shaped tube body 10 made of a heat conductor metal, whose two ends 12, 14 are connected to a blower that blows air or another gas or gas mixture into the tube body 10. In the example, the cross section of the tube body 10 is round. The outer diameter is 5 mm, the wall thickness, 1 mm.

In FIG. 1, this is done with the aid of the proposed temperature sensor 6 and electronic regulators or controller 8 which very precisely detect the temperature and temperature changes of the tube body and/or the hot gas and correspondingly vary the current intensity for heating the tube body 10. In the illustrated embodiment, the tube body 10 itself is also used directly as a temperature sensor, while the intensity of the current is controlled by controller 8 as a function of the tube body resistance, which changes with the temperature. This resistance can be very precisely detected with the aid of electronic circuits associated with temperature sensor 6.

Figure 2:
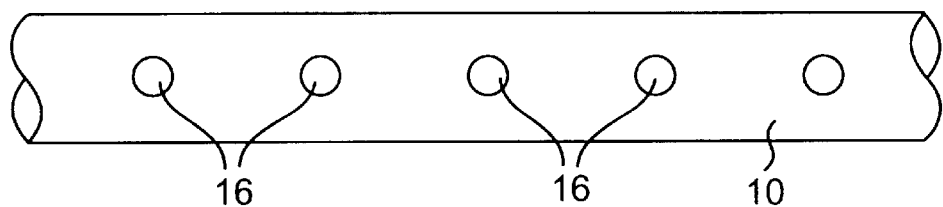
Figure 3:
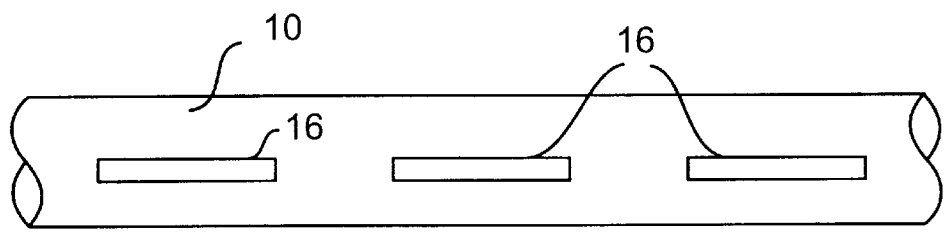

The inlet openings 16 can be circular as indicated in FIG. 2 or can comprise slots as indicated in FIG. 3. As indicated in FIGS. 2 and 3, tube 10 can be round or circular in cross section as stated above.

Figure 4:
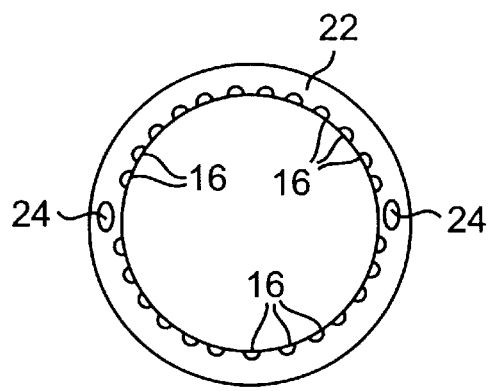

Depending upon the employment purpose, instead of a tube body that is open on both ends, a tube body that is closed on one end can also be used, or the tube can be embodied as a closed loop with one or more lateral inlet openings as shown in FIG. 4 wherein the tube body is denoted 22 and the lateral inlet openings are denoted 24 (The outlet openings are denoted 16 as in the previous figures.) For packaging machines, slot widths or bore diameters of approximately 1 mm have turned out to be particularly suitable for outlet openings 16 which are disposed at a spacing of approximately 5 mm from one another, but could also have various spacings, e.g. ones which decrease in size in one direction.

Figure 5:
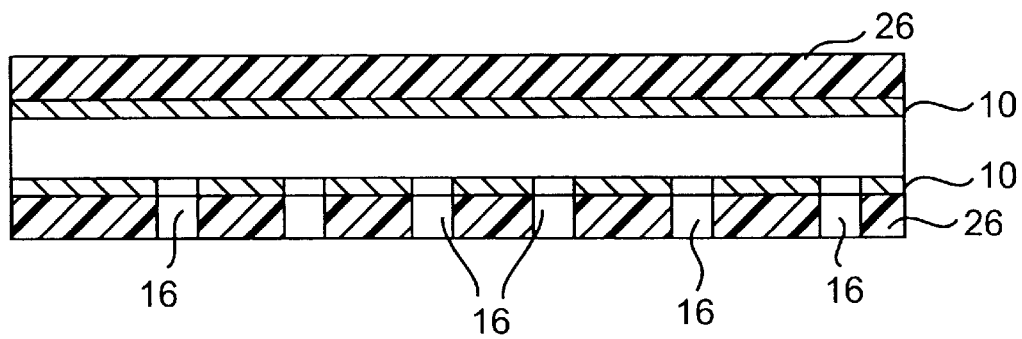

Improvements in efficiency of the devices can be achieved by means of a thermal insulation 26, which encompasses the tube body 10 as shown in FIG. 5; however, the outlet openings 16 remain unblocked as illustrated.

What is claimed is:

1. In a process for welding plastic sheets with hot gas, the improvement wherein the gas is blown through a tubular heating conductor comprising a tube body including spaced electrical connections and at least one outlet opening in a circumferential wall of the tube body between the electrical connections, against a plastic sheet disposed at a distance from the tube body, and, to heat the gas, an electric current is conducted through the electrical connections and the tube body, the intensity of said current being controlled by at least one temperature sensor exposed to the temperature of the tube body, the tube body having an electrical resistance which changes with temperature and the intensity of the current being controlled as a function of the electrical resistance of the tube body.

2. The process according to claim 1, wherein the tube body has a longitudinal axis and the plastic sheet is conveyed past the at least one outlet opening of the tube body along the longitudinal axis thereof.

3. The process according to claim 1, wherein the gas is blown through the tube body in a pulsating manner.

4. The process according to claim 1, wherein the gas is blown into the tube body through air inlets on both ends.

5. The process according to claim 1, wherein the gas is blown into the tube body through at least one inlet of a closed loop constituting the tube body.

6. The process according to claim 1, wherein the hot gas exits through a plurality of outlet openings disposed in a row in a straight region of the tube body.

7. The process according to claim 1, wherein the tube body has a circular cross section.

8. The process according to one of claim 1, wherein the at least one outlet opening comprises a plurality of outlet openings which are essentially round holes.

9. The process according to claim 1, wherein the at least one outlet opening comprises a plurality of outlet openings comprising slots.

10. The process according to claim 1, wherein the tube body is insulated from the air by a thermal insulation that has at least one corresponding hole for the air to exit.

* * * * *